United States Patent
Pittius

(10) Patent No.: US 7,053,512 B2
(45) Date of Patent: May 30, 2006

(54) VENTILATION DEVICE WITH ELECTROMAGNETIC COUPLING

(75) Inventor: Ekkehard Pittius, Roth (DE)

(73) Assignee: Siemens Aktiengesellschaft, München (DE)

( * ) Notice: Subject to any disclaimer, the term of this patent is extended or adjusted under 35 U.S.C. 154(b) by 127 days.

(21) Appl. No.: 10/381,466

(22) PCT Filed: Sep. 21, 2001

(86) PCT No.: PCT/DE01/03654

§ 371 (c)(1), (2), (4) Date: Mar. 24, 2003

(87) PCT Pub. No.: WO02/27896

PCT Pub. Date: Apr. 4, 2002

(65) Prior Publication Data

US 2004/0036375 A1    Feb. 26, 2004

(30) Foreign Application Priority Data

Sep. 26, 2000 (DE) .................. 100 47 592

(51) Int. Cl.
*H02K 49/02* (2006.01)
*H02K 9/00* (2006.01)

(52) U.S. Cl. .................. 310/105; 310/156.11; 310/62; 310/63

(58) Field of Classification Search ................ 310/211, 310/125, 103, 104, 105, 106–108, 109, 62, 310/63; 464/29
See application file for complete search history.

(56) References Cited

U.S. PATENT DOCUMENTS

| | | | | |
|---|---|---|---|---|
| 4,564,335 A | * | 1/1986 | Harmsen et al. | 415/218.1 |
| 5,096,024 A | * | 3/1992 | Wu | 188/267 |
| 5,608,281 A | * | 3/1997 | Gerling et al. | 310/268 |
| 5,783,888 A | | 7/1998 | Yamano | |
| 6,548,929 B1 | * | 4/2003 | Nelson et al. | 310/105 |
| 6,661,144 B1 | * | 12/2003 | Diener et al. | 310/105 |
| 6,753,628 B1 | * | 6/2004 | Neal | 310/43 |

FOREIGN PATENT DOCUMENTS

| | | |
|---|---|---|
| DE | 1 538 974 A | 2/1970 |
| DE | B 25 14 265 | 10/1976 |
| EP | 0 826 266 | 11/1998 |
| EP | 0 930 692 | 7/1999 |
| EP | 1 024 295 | 8/2000 |
| FR | 2 778 327 | 11/1999 |

\* cited by examiner

*Primary Examiner*—Tran Nguyen
*Assistant Examiner*—Leda Pham
(74) *Attorney, Agent, or Firm*—Henry M. Feiereisen

(57) ABSTRACT

Ventilation devices, in particular for electric motor drives regularly comprise a fan wheel (1), which is driven by a shaft via an electromagnetic induction coupling. In order to reduce the complexity of manufacture, a stack of magnetic sheets (2) is cast in the aluminum hub of the fan wheel (1). Thus, aluminum also assumes at the same time the function of a damper winding.

10 Claims, 1 Drawing Sheet

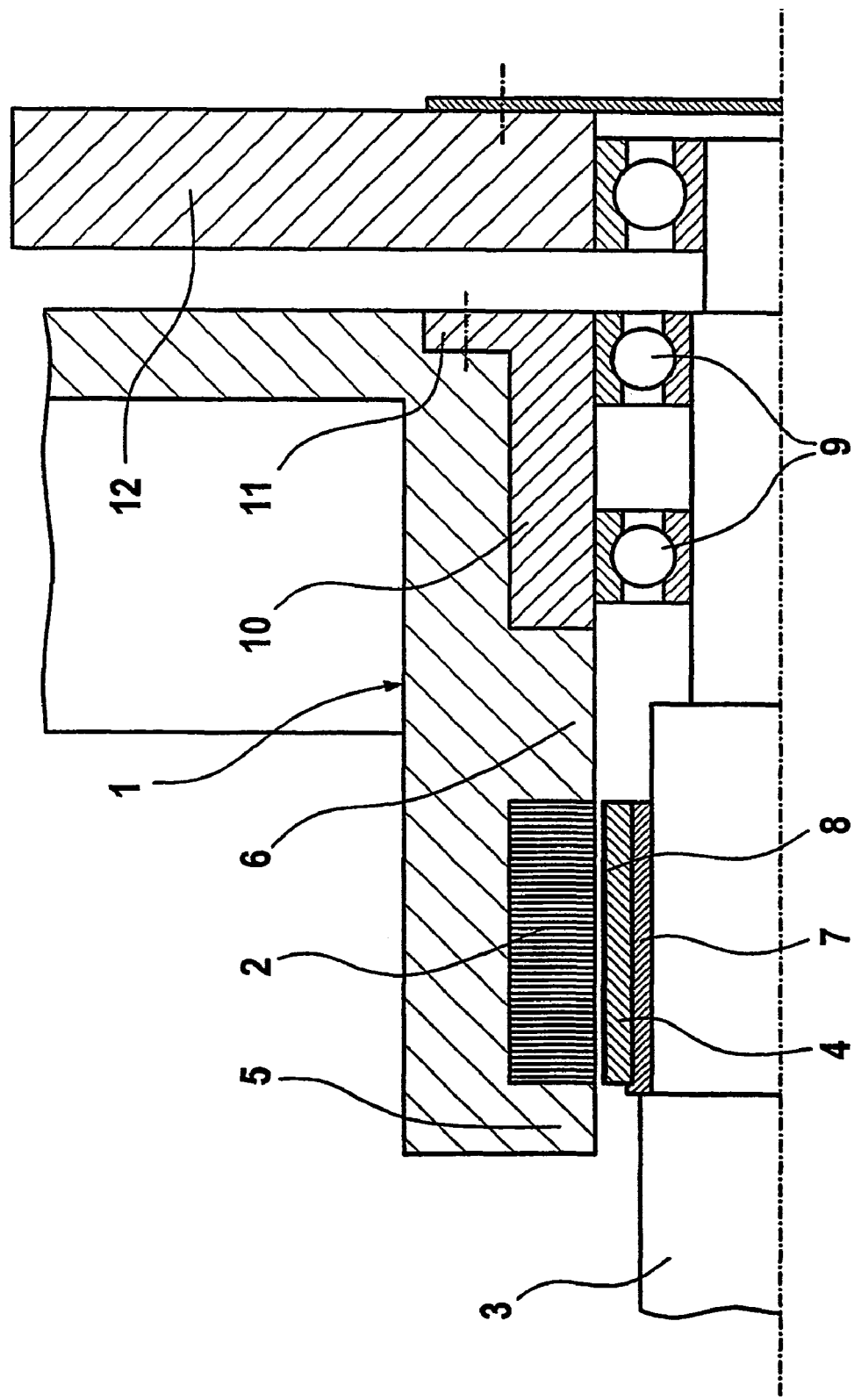

VENTILATION DEVICE WITH ELECTROMAGNETIC COUPLING

BACKGROUND OF THE INVENTION

The present invention relates to a ventilation device having a fan wheel which includes a hub for securement of the fan wheel to a shaft. Furthermore, the present invention relates to an electric machine with such a ventilation device and to a respective manufacturing process.

Ventilation devices are normally used in high-powered electric motors in which the surrounding medium is no longer sufficient to provide a natural cooling. There is the option to actively ventilate the electric motors, i.e. provision of an additional fan motor with fan wheel for attachment to the electric motor to realize cooling of the electric motor. In addition, there is the option to cool an electric motor through self-ventilation by mounting a fan wheel to the shaft of the motor rigidly or via a coupling.

Electric motors for rail-bound and track-bound vehicles, such as three-phase rail traction motors, are increasingly operated at high rotation speeds in order to keep the motor torque and thus the motor weight as well as the size small. According to DE-B-25 14 265, the motor cooling is implemented by providing a fan wheel which is fixedly mounted to the motor shaft and which is driven by the respective motor speed and draws or pushes the ambient air either through the motor or through particular external cooling ducts. Such a fan wheel, fixedly mounted in this manner to the motor shaft, has the drawbacks that, on one hand, the amount of cooling air is always proportional to the motor speed, and, on the other hand, the fan wheel generates extremely annoying noises when rotating at high speeds.

To eliminate these drawbacks, the motor cooling according to EP 0 826 266 B1 provides for a fan wheel which is freely rotatably supported by the motor shaft. Disposed between the motor shaft and the fan wheel is an electromagnetic speed limiting and control unit which restricts the transport of cooling air in accordance with the required amount of cooling air. At a predetermined motor speed, the rotation speed of the fan wheel is reduced in relation to the motor speed by rendering the engagement action of the electromagnetic speed limiting device, configured as induction coupling, almost ineffective as the rotation speed of the motor shaft increases. As the motor speed drops, the engagement action is re-established until fully restored. Thus, the cooling air is made available at sufficient amount, when the motor speed is low, while the amount of cooling air to be transported no longer rises proportionately to the increase in motor speed, when the motor speeds are higher or high. Further, the energy consumption and the noise generation of the fan, in particular at high rotation speeds, is significantly reduced. The fan wheel used there, is so constructed as to have a short-circuit winding in the hub of the fan wheel. Manufacture of such an electromagnetic induction coupling is relatively complicated.

EP 1 024 295 A1 discloses the manufacture of the fan wheel or of the hub of the fan wheel from non-ferromagnetic material, e.g. aluminum. As aluminum is not ferromagnetic, the coupling effect between the fan wheel of aluminum and the motor shaft with permanent magnets is relatively slight. In addition, this printed publication describes the support of a fan wheel in a bearing plates or casing and the provision of an associated electromagnetic induction coupling.

SUMMARY OF THE INVENTION

On the basis of the drawbacks, set forth above, it is the object of the invention to propose a ventilation device which is easy to manufacture, on one hand, and easy to electromagnetically link to a shaft, on the other hand.

This object is attained in accordance with the invention by a ventilation device in which a magnetizable component, in particular a magnetic sheet stack assembly, is accommodated in the hub in such a manner that metal portions of the hub assume the function of a damper winding. Embedment of a possibly pre-fabricated stack of sheets in the aluminum fan, significantly improves the effectiveness of a magnetic coupling of the ventilation device to, for example, a motor shaft. The stack of magnetic sheets is hereby so embedded in the hub of the fan that the metal portions, surrounding the stack of magnetic sheets, serve as damper winding so that the need for a separate component as damper winding is eliminated.

According to a preferred embodiment, the fan wheel is cast with the hub in single-piece configuration from aluminum and the sheet stack assembly is cast into the hub. As a consequence, there is the advantage with respect to manufacturing that the stack of magnetic sheets is integrated in the hub already during the casting process of the aluminum fan and moreover there is no need for providing further mounting tools to secure the stack of magnetic sheets.

Electric machines, in particular electromotive drives, can be equipped with the ventilation device according to the invention, wherein an electromagnetic induction coupling is realized between the shaft of the electric machine and the fan wheel by the interaction between a permanent magnetic assembly, mounted on the shaft, and the stack of magnetic sheets of the fan.

A ventilation device can be made by a method according to the invention, by providing a casting mold for the fan wheel, by placing the magnetizable component, in particular the sheet stack assembly, in the hub area of the casting mold, and by casting the casting mold with aluminum.

In accordance with a further development, the ventilation device, after the aluminum has hardened, is turned out in the hub to remove possible presence of aluminum residues, so that the magnetizable component is exposed in the interior of the hub and the required air gap can be adjusted for implementing an electromagnetic induction coupling.

BRIEF DESCRIPTION OF THE DRAWING

The present invention will now be described in detail with reference to the drawing which shows a cross sectional view of a ventilation device according to the invention, as installed in an electric machine.

DETAILED DESCRIPTION OF PREFERRED EMBODIMENTS

The drawing shows a preferred embodiment of the present invention. The fan wheel 1 shown here is cast from aluminum. A sheet stack 2 is cast in the hub of the fan wheel 1. The surface of the sheet stack 2 is flush with the hub inner side of the fan wheel 1. It is essential that the sheet stack 2, comprised of magnetic sheets, forms part of the inner surface of the fan wheel hub to enable implementation of a strongest possible magnetic coupling with permanent magnets 4 mounted on a shaft 3. The better the magnetic coupling between shaft and fan wheel, the better the run-up properties of the fan wheel 1. In particular at rapid run-up of the shaft 3, a correspondingly rapid run-up of the fan wheel is normally desirable. Beneficial for the rapid run-up of the fan wheel is also a small own weight. In this respect, aluminum has also advantages compared to spherulitic steel that is oftentimes used to date.

Typically, the sheet stack assembly 2 accommodated in the fan hub can be, e.g., riveted, welded or clamped.

Furthermore, the sheet stack assembly 2 may be made of several partial rings of sheet stacks to improve heat conduction in the fan hub.

The sheet stack assembly 2 is provided on the hub inner side preferably with not shown essentially axially extending slots for receiving winding bars. These winding bars are part of a short-circuit winding. The short-circuit winding is complemented by the hub portions 5 and 6, serving as short-circuit rings and manufactured, like the entire fan wheel 1, of aluminum or a metal with similar material properties. The embedment of the sheet stack assembly 2 in the aluminum hub of the fan wheel 1 eliminates the need for a separate damper winding.

The shaft 3 carries the permanent magnet assembly 4 either directly on its surface or via interposition of a steel ring 7. Interposition of the steel ring 7 has the advantage that the permanent magnet assembly 4 can be pre-fabricated before mounting to the shaft 3. Hereby, individual permanent magnets are glued onto the steel ring and subsequently bandaged about their outer circumference against centrifugal forces, as illustrated in the drawing by the bandage 8. Finally, the glued and bandaged permanent magnets are cast or impregnated in conventional manner against corrosion. The thus pre-fabricated steel ring 7 with permanent magnet assembly 4 is then shrunk, for example, onto the shaft 3.

The support of the fan wheel 1 by the shaft 3 is realized according to the drawing by two bearings 9. Conceivable is also the support via a double-row bearing or other common bearings. Associated to the bearing support is further a not shown axial securement which is known per se. Instead of a support on the shaft 3, the fan wheel 1 may also be supported in a bearing plate or casing 12.

As aluminum has a greater thermal expansion coefficient than steel, normally used for rolling-contact bearings, a further steel ring 10 is provided for support of the fan wheel 1 upon the bearing 9. A flange 11 additionally secures the steel ring 10 upon the fan wheel 1.

The further steel ring 10 has several functions. For one, the steel ring protects the bearing 9 against excessive pressure which the aluminum hub would exert upon the steel bearing 9 as a result of the different thermal expansion coefficients. Further, the steel ring 10 holds with its flange 11 the aluminum fan wheel 1, even when the aluminum expands to a greater extent in relation to the steel. Finally, the steel ring 10 has also the advantage that steel has smaller heat conductivity than aluminum. As a consequence, the heat conduction is reduced, for example, from the short-circuit bars of the sheet stack 2 directly to the bearing 9. In this way, a premature aging of the lubricants is prevented.

Instead of or in addition to the short-circuit cage or cages, the fan wheel hub may also be provided with reluctance gaps, so that the inductance coupling operates in accordance with the operating principle of the reluctance machine. The reluctance principle ensures in a wide range a slip-free run and thus a synchronous operation. The detachment moment of the reluctance coupling can be selected according to the demanded fan throughput.

The manufacture of the fan wheel device shown in the drawing can be realized by, for example, casting one or more pre-fabricated sheet stacks without winding into the fan hub. The aluminum casting material encasing the sheet stack assembly replaces the otherwise required winding. Dimensioning of the magnetic circuit is suitably realized in a way that inexpensive standardized sheet stacks can be used.

The rough outer contour of the sheet stack 2, held together, for example, by clamping grooves, ensures a good bond upon the aluminum cast. The slot openings for the short-circuit cage should be dimensioned comparably wide, so that the aluminum can penetrate radially into the slots also without a die-casting process. When the sheet stack 2 is further subdivided in several partial sheet stack rings, aluminum can penetrate more easily into the respective slots as the slots are correspondingly shortened and an inflow of aluminum from several sides is possible.

In the context of manufacturing the fan wheel device, the sheet stack may be turned out at the inner diameter to remove aluminum residues and to adjust the required air gap.

The single-piece manufacture of the damper winding and fan in a cast structure realizes a cost-efficient manufacturing process. Casting of the sheet stack ensures very good electromagnetic properties of the fan wheel device in induction couplings.

What is claimed is:

1. A ventilation device, comprising:
    a fan wheel having a hub made of metal; and
    a magnetic sheet stack assembly embedded in the hub so that metal portions of the hub, surrounding the magnetic sheet stack assembly, assume the function of a damper winding, said magnetic sheet stack assembly forming part of an inside surface of the hub in spaced-apart confronting relationship to a permanent magnet assembly of a moving member to magnetically couple the fan wheel and the moving member.

2. The ventilation device of claim 1, wherein the metal is aluminum.

3. The ventilation device of claim 1, wherein the fan wheel is cast with the hub in single-piece configuration from aluminum, and the magnetic sheet stack assembly is cast into the hub.

4. The ventilation device of claim 1, wherein the magnetic sheet stack assembly is made of at least one sheet stack.

5. The ventilation device of claim 1, and further comprising a ring mounted in or to the hub in axially offset relationship to the magnetic sheet stack assembly, and a bearing received in the ring for permitting a rotation movement of the fan wheel.

6. The ventilation device of claim 5, wherein the ring is made of steel.

7. The ventilation device of claim 1, wherein the hub of the fan wheel has reluctance gaps.

8. An electric machine, in particular electromotive drive, comprising:
    a rotatable shaft;
    a permanent magnet assembly disposed on the shaft; and
    a ventilation device including a fan wheel having a hub disposed at a distance to the shaft and made of metal, and a magnetic sheet stack assembly embedded in the hub so that metallic portions of the hub, surrounding the magnetic sheet stack assembly, assume the function of a damper winding, said magnetic sheet stack assembly forming part of an inside surface of the hub in confronting relationship to the permanent magnet assembly to establish a magnetic coupling between the fan wheel and the shaft.

9. The electric machine of claim 8, and further comprising a ring secured on the shaft and having an outer circumference, and a permanent magnet assembly so disposed on the outer circumference of the ring in relation to the hub of the fan wheel as to establish an optimum magnetic interaction with the magnetic sheet stack assembly.

10. The electric machine of claim 9, wherein the ring is made of steel.

* * * * *